(No Model.) 4 Sheets—Sheet 1.
A. R. CAVNER.
POWER GEARING FOR CARS IN TRAIN.
No. 439,108. Patented Oct. 28, 1890.
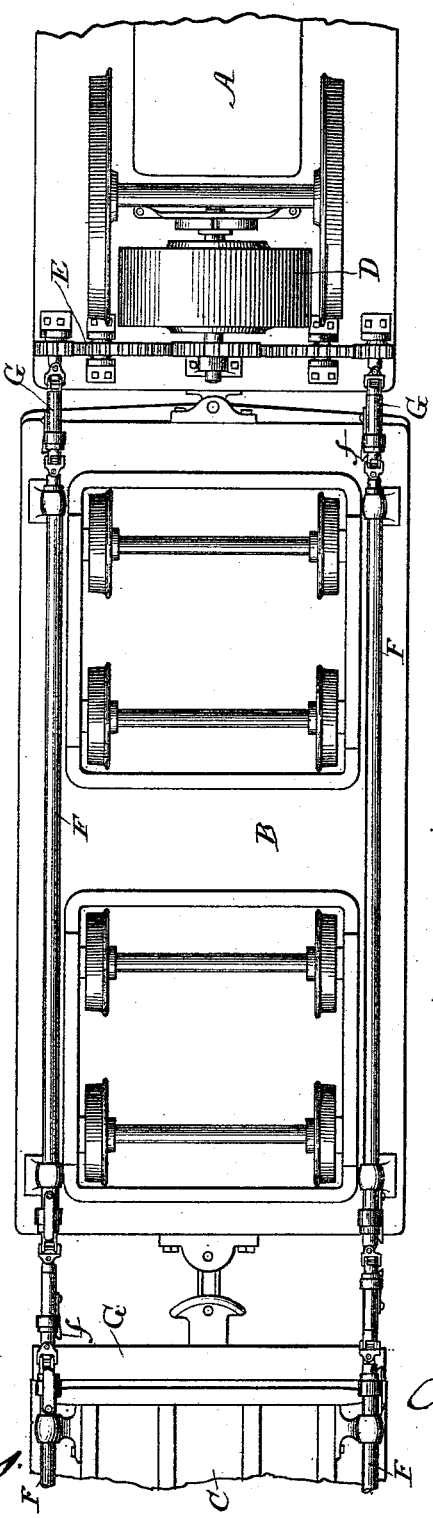
Fig.1
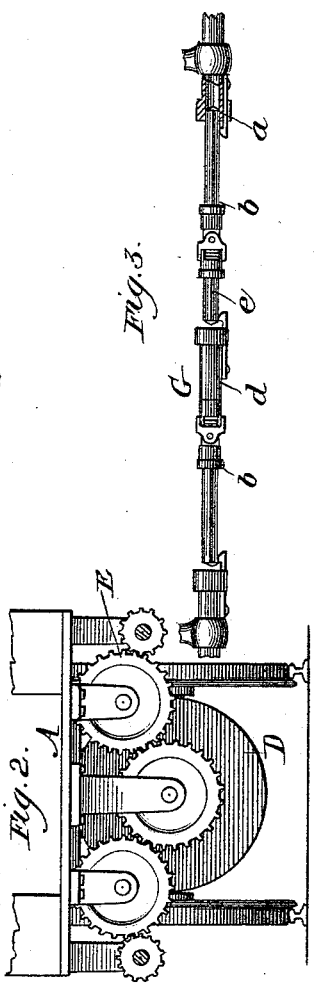
Fig.2
Fig.3
Witnesses:
Harry T. Jones
Albert H. Adams
Inventor:
Alexander R. Cavner (No Model.)  4 Sheets—Sheet 3.

A. R. CAVNER.
POWER GEARING FOR CARS IN TRAIN.

No. 439,108.  Patented Oct. 28, 1890.

Witnesses:
Harry F. Jones.
Albert H. Adams.

Inventor:
Alexander R. Cavner (No Model.) 4 Sheets—Sheet 4.
A. R. CAVNER.
POWER GEARING FOR CARS IN TRAIN.
No. 439,108. Patented Oct. 28, 1890.
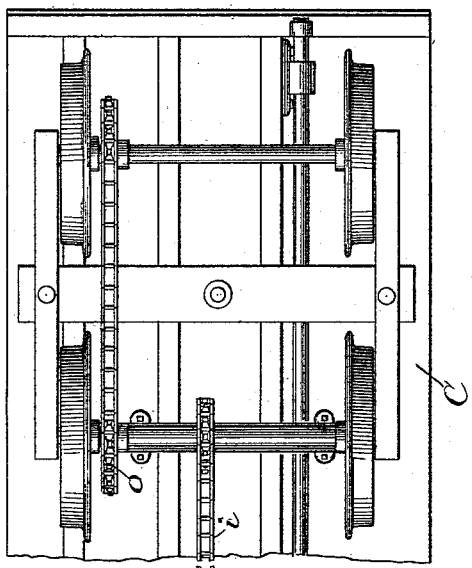
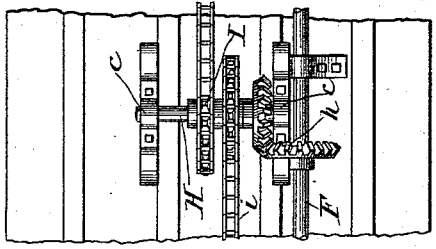
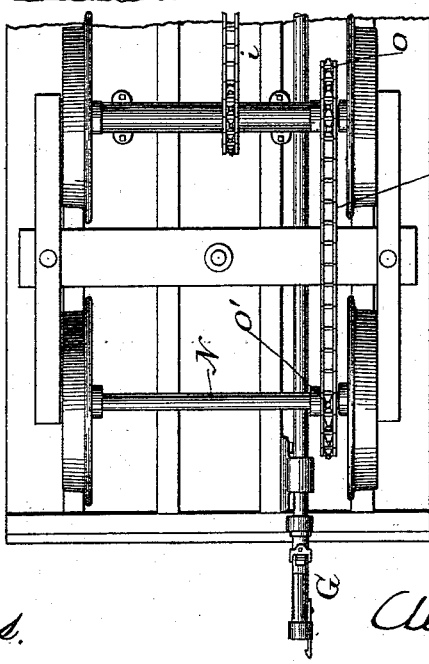
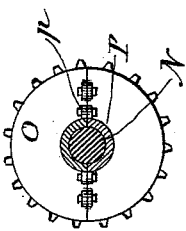
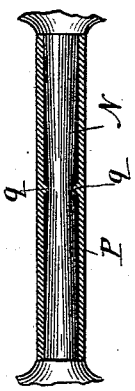

UNITED STATES PATENT OFFICE.

ALEXANDER R. CAVNER, OF CHICAGO, ILLINOIS.

POWER-GEARING FOR CARS IN TRAIN.

SPECIFICATION forming part of Letters Patent No. 439,108, dated October 28, 1890.

Application filed April 5, 1890. Serial No. 346,676. (No model.)

*To all whom it may concern:*

Be it known that I, ALEXANDER R. CAVNER, residing at Chicago, county of Cook, and State of Illinois, and a citizen of the United States, have invented a new and useful Improvement in Applying Power to Cars in Train, of which the following is a specification, reference being had to the accompanying drawings, in which—

Figure 4:
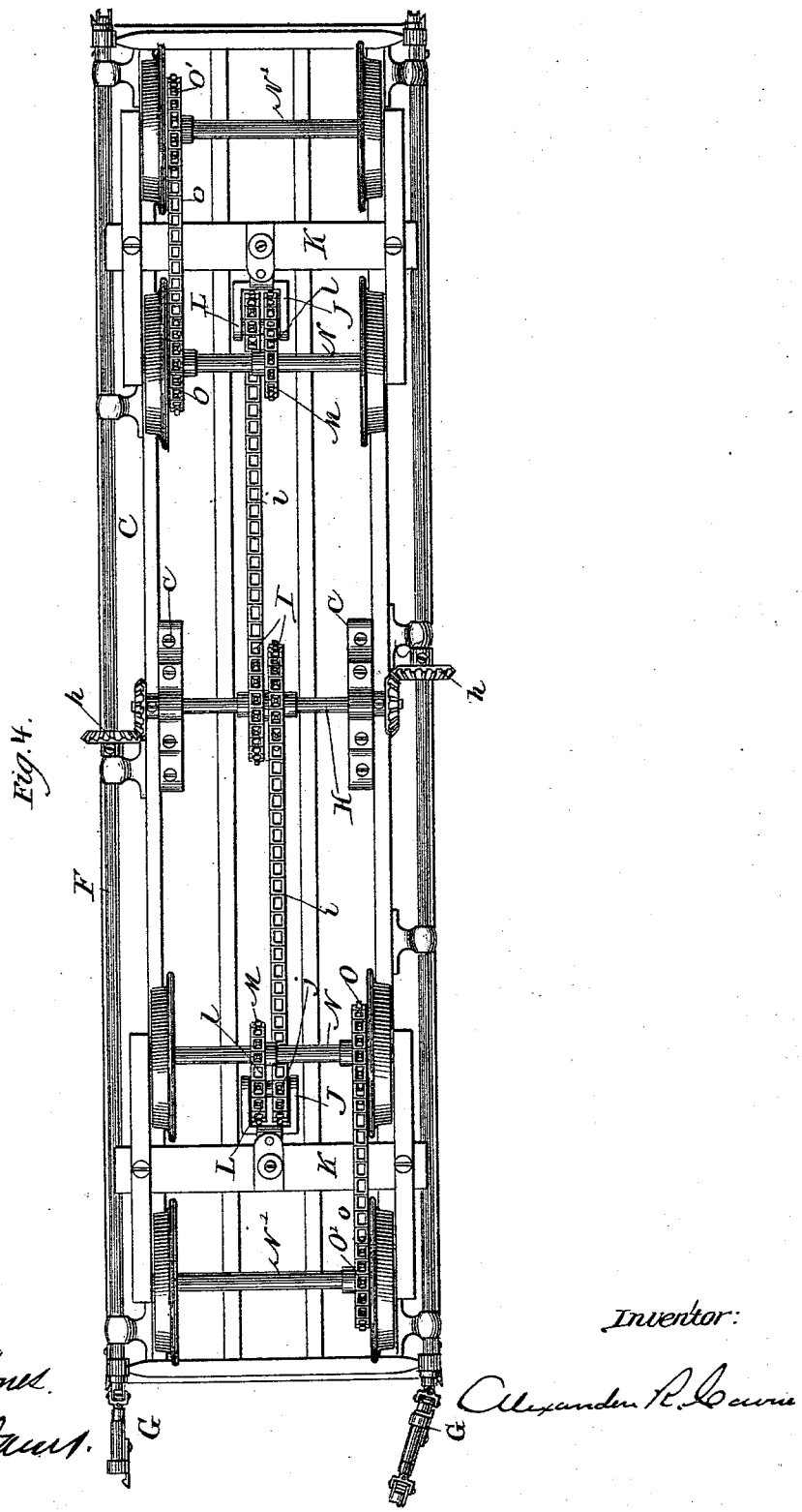
Figure 5:
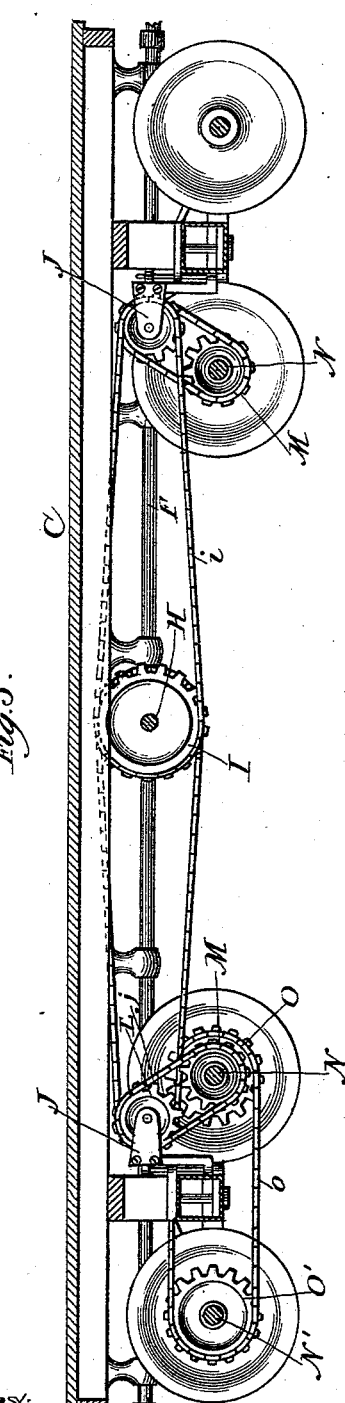
Figure 6:
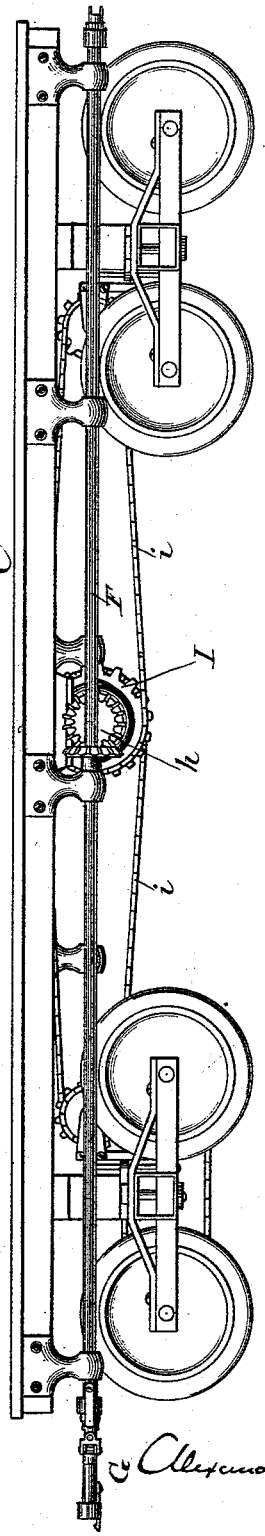

Figure 1 is an under side view showing a motor-car, an intervening car, and a car to which power is to be applied. Fig. 2 is an end elevation of the motor-car, showing the driving-power. Fig. 3 is an enlarged detail, being a longitudinal section through the coupling between two cars. Fig. 4 is an under side view of a car to which the power is to be applied, showing two power-transmitters. Fig. 5 is a longitudinal section through a car to which power is to be applied. Fig. 6 is a side elevation of a car to which power is to be applied. Fig. 7 is an under side view of a car to which power is to be applied, showing a single power-transmitter. Fig. 8 is an enlarged detail showing the method of attaching the sprocket-wheel to the axle of a car, and Fig. 9 is a longitudinal section through the above.

At the present time it is the common practice to apply the driving-power to the carrying-wheels of the motor-car, and the motor-car pulls or pushes the remaining cars of the train. This necessitates making the motor-car very heavy, in order to give sufficient traction to its carrying-wheels to pull or push the cars of the entire train.

The object of this invention is to apply the driving-power to the carrying-wheels of all of the cars or a large number of the cars in train, which I accomplish as illustrated in the drawings, and as hereinafter described. That which I claim as new will be pointed out in the claims.

In the drawings, A represents a motor-car.

B is an intermediate car, such as the tender of a locomotive.

C represents one of the cars of a train.

D is the motor. This may be a rotary or other steam-engine, a gas-engine, electric motor, or other driving-power.

E represents gearing connected with the motor.

F F are power-transmitters. The power-transmitters shown consist of shafts secured in suitable bearings beneath the frames of the cars B C.

G G represent connecting devices between the power-transmitters of the adjoining cars.

H is a shaft secured in suitable bearings $c$ beneath the frame of a car C. It is driven by suitable gearing $h$ from the shaft or power-transmitter F. This gearing may be any form of toothed or friction gear. When two shafts F are employed on opposite sides of the car, gearing $h$ is to be provided for driving the shaft H from both shafts F, as shown in Fig. 4; but when a single shaft or power-transmitter F is employed a single set of gearing $h$ is to be employed, as shown in Fig. 7.

I I are sprocket-wheels secured upon the shaft H.

J J are pulley-blocks, one pivotally connected to the center of the truck-frame K at each end of the car C, as shown in Fig. 4. A sprocket-wheel $j$ is secured upon a shaft in each block J, each of which sprocket-wheels is driven by a drive-chain $i$ from one of the sprocket-wheels I.

L represents a sprocket-wheel secured upon the shaft in the pulley-block J.

M represents a sprocket-wheel secured upon the axle N of a pair of carrying-wheels, as shown in Fig. 4, driven from the sprocket-wheel L by a chain $l$.

O is a sprocket-wheel secured upon the axle N.

O' is a sprocket-wheel secured upon an axle N' of another pair of carrying-wheels in the same truck. The sprocket-wheel and axle N' are driven by the drive-chain $o$ from the sprocket-wheel O.

The motor D may be placed upon a motor-car having a separate driving-power for driving its own carrying-wheels—such as a railway-locomotive—or the present motors may be employed by connecting the power-transmitters therewith by suitable gearing, or it may be applied to a car and be the only power employed in driving the train, and may be in such case connected with the carrying-wheels of the car upon which it is placed. I do not limit my invention to any form of motor D. The power from the motor D will be transmitted through its gearing E, transmitters F, connecting-links G, and gearing h to the shaft H. This shaft H may be located in any convenient position beneath the frame of the car C. The wheel or wheels j and wheel or wheels L will be driven by the drive-chain i from the sprocket-wheels I, and the sprocket wheel or wheels M will be driven from the sprocket-wheels L, thereby driving the carrying-wheels of the car C. The power-transmitters F at the adjoining ends of the several cars are connected, so that the carrying-wheels, or a number of the carrying-wheels, of each car of the train are driven from the motor D. This construction and method of applying power distributes the application of the power to all or nearly all of the cars in the train, so that the traction of the wheels of the several cars is utilized, thereby dispensing with the necessity of making a single motor-car or locomotive sufficiently heavy to give traction enough to move the entire train, as is the case when the power is applied to the carrying-wheels of the motor-car or locomotive only.

The distance between the ends of the shafts or power-transmitters F at the adjoining ends of two cars will vary with the length of the couplings between the cars, also at different times when the cars are passing around curves. This variation must be compensated for. I do this and provide for the lateral and vertical swing or vibration of the cars by the connecting devices G, which are illustrated in detail in Fig. 3. The end of each shaft or power-transmitter F is provided with a long angular recess a.

b b are keys having long angular stems adapted to enter the recesses a.

d is a sleeve connected by a universal joint with a key b. This sleeve d has an angular recess with an enlarged opening or bell-mouth.

e is an angular key connected with one of the keys b by a universal joint and adapted to enter the recess in the sleeve d. It is pointed at its end, so as to readily enter the enlarged opening or bell-mouth of the recess f is a spring-catch on the sleeve d, arranged to engage with a rib or collar on the key e for holding the key e in the sleeve d.

The rotary movement of the shaft or power-transmitter F of one car will be transmitted to the shaft or power-transmitter F of the adjoining car through the connecting device G, above described, and any variation in the distance between the adjoining ends of the shafts or power-transmitters F will be compensated for by the longitudinal movement of the keys b in the recesses a. The universal joints form a flexible coupling, which will permit the cars to swing laterally and vertically independently of each other, and will permit cars of different heights to be coupled without interfering with the rotary movement of the shafts and connecting device. The shafts or power-transmitters on two cars can be readily coupled by sliding the key e in the sleeve d, the enlarged opening or bell-mouth of the sleeve and the point on the key facilitating the insertion of the key into the sleeve.

The shafts F are provided with catches g to engage with collars on the keys b when the keys are pushed in to their inner limit, and thereby hold the key within the recess in the shaft to prevent the key from being accidentally removed when the car is in motion and the key is not connected with the key of an adjoining car.

When the cars pass around curves, the axle N must necessarily swing on the curves. The power is transmitted to the axles N through the sprocket-wheels on the pulley-block J and drive-chains, and the pulley-block is swiveled to the center of the car-truck, so that the swinging of the axle N will not interfere with the chains and sprocket-wheel L, and the pulley-block being so swiveled at the center of the truck its relation to the shaft H will not vary. I do not limit my invention to the use of this construction, as the power may be transmitted directly to the axle, as shown in Fig. 7; but such construction will be found exceedingly valuable where the trucks are pivotally connected with the frames of the cars.

Any number of cars may be connected together and the power transmitted through the power-transmitters F may be distributed to the several cars. As many of the carrying-wheels of each car may be connected with the power-transmitters as may be necessary to give the necessary traction for that car.

I do not confine my invention to any specific form of devices for transmitting power, nor to any specific form of motor, as these may be varied. The motor-car may be the first or the last car in the train or an intermediate car.

As shown in Fig. 1, the tender of a locomotive or other car may not have its wheels connected with the power-transmitters; but it is the object of this invention that all or nearly all of the cars have their carrying-wheels connected with the power-transmitters.

I do not confine my invention to the use of sprocket-wheels and drive-chains for communicating power from the shaft H to the axle of the cars, as a cable or belt may be used in place of the chain and the form of the wheels varied accordingly.

The axles of railway-cars as now constructed are somewhat larger in diameter near the wheels than at their middle portion. It is also desirable that there shall not be any great strain upon the middle portion of the axle, as might be the case in some instances in securing the wheel M upon the axle. I therefore provide a sleeve P (see Figs. 8 and 9) consisting of two sections, which are clamped upon the axle N by clamping-bolts p. The sleeve P may be of uniform diameter, so that it will not bear upon the axle N at its middle portion, where said axle is smaller in diameter. The interior of the sleeve may be provided with ribs $q$ to support the middle portion of the sleeve from the axle N. By this construction the strain of the driving-wheel will be upon the sleeve, which is clamped to the outer ends of the axle near the wheels, thereby preventing any undue strain from being brought upon the middle portion of the axle.

What I claim as new, and desire to secure by Letters Patent, is—

1. The combination, with the carrying-wheels of a number of cars in train, of a driving-shaft H on each car, chains and wheels for driving the carrying-wheels of each car from its shaft H, a motor, and power-transmitters between the motor and the several driving-shafts H, substantially as specified.

2. The combination, with the carrying-wheels of a number of cars in train, of a driving-shaft H of each car, chains and wheels for driving the carrying-wheels of each car from its driving-shaft H, a motor, power-transmitters between the motor and driving-shafts H, and connecting devices between the adjoining ends of power-transmitters of two cars for transmitting rotary motion and permitting variation laterally, vertically, and longitudinally, substantially as specified.

3. The combination, with a driving-shaft H, a car-wheel axle, and wheel thereon, of a block swiveled to the car-truck near its center, wheels therein, and chains or belts $i\,l$, substantially as specified.

4. The combination, with a car-wheel axle, of a sleeve, devices for clamping this sleeve thereon, and a driving-wheel on said sleeve, substantially as and for the purpose specified.

ALEXANDER R. CAVNER.

Witnesses:
CHAS. KENNEDY,
HARRY T. JONES.